United States Patent [19]

Tilton et al.

[11] 3,715,617

[45] Feb. 6, 1973

[54] OPTICAL PROBE FOR CATHODE RAY TUBES

[75] Inventors: Homer B. Tilton, Tucson; Jack W. Blanchard, Phoenix, both of Ariz.

[73] Assignee: Sperry Rand Corporation, New York, N.Y.

[22] Filed: July 10, 1970

[21] Appl. No.: 53,766

[52] U.S. Cl. ....................315/10, 315/22, 313/65 LF, 250/227

[51] Int. Cl. ....................H01j 31/26

[58] Field of Search...315/10, 32, 31 TY; 313/65 LF; 250/227

[56] References Cited

UNITED STATES PATENTS

| | | | |
|---|---|---|---|
| 3,058,021 | 10/1962 | Dunn | 313/65 LF |
| 3,096,399 | 7/1963 | Thomas, Jr. | 250/200 X |
| 3,153,172 | 10/1964 | Ling | 315/10 |
| 3,404,226 | 10/1968 | Szeremy et al. | 315/10 X |
| 3,471,740 | 10/1969 | Dreyfoos, Jr. et al. | 315/10 |
| 3,497,701 | 2/1970 | Dalton | 250/227 X |

FOREIGN PATENTS OR APPLICATIONS

| | | | |
|---|---|---|---|
| 1,437,091 | 3/1966 | France | 313/65 LF |
| 1,047,953 | 11/1966 | Great Britain | 313/65 LF |

*Primary Examiner*—Carl D. Quarforth
*Assistant Examiner*—P. A. Nelson
*Attorney*—S. C. Yeaton

[57] ABSTRACT

A fiber optics probe, embedded in the faceplate of a cathode ray tube, samples the light emitted from the cathode ray tube phosphor coating. The sampled light is sensed and provides an equivalent electrical signal. The magnitude of the signal is compared with a signal proportional to the ambient light and the resultant signal is utilized to effect an automatic brightness control function. The resultant signal may also be used to effect a built-in test of the cathode ray tube drive and display circuits.

14 Claims, 4 Drawing Figures

INVENTORS
HOMER B. TILTON
JACK W. BLANCHARD
BY
HP Terry
ATTORNEY

INVENTORS
HOMER B. TILTON
JACK W. BLANCHARD
BY
HP Terry
ATTORNEY

OPTICAL PROBE FOR CATHODE RAY TUBES

BACKGROUND OF THE INVENTION

1. Field of the Invention

The invention relates to automatic brightness control systems and built-in test equipment for cathode ray tube displays.

2. Description of the Prior Art

Automatic brightness control for display units has not in the past included the cathode ray tube characteristics, but rather has been open loop; that is, a signal proportional to ambient light is used to directly control the cathode ray tube video level or d.c. grid-cathode bias. Likewise, the built-in test function has not included the cathode ray tube itself. This system has necessarily led to an inherently imprecise definition of the total system.

SUMMARY OF THE INVENTION

One end of a fiber optics bundle is imbedded in a small portion of the cathode ray tube face so that it is responsive to excitation of a discrete portion of the phosphor coating within the cathode ray tube. The driving circuitry of the cathode ray tube is modified so that at prescribed intervals, such as at the completion of each frame, the electron beam is slewed to excite the phosphor coating adjacent the fiber optics bundle. The output thereof becomes reflective of the most used portion of the phosphor coating on the cathode ray tube. Thereby, the invention lends itself to a convenient, reliable and continuous failure monitor. A photosensor or other light responsive device capable of producing an electrical output is affixed to the other end of the fiber optics bundle. The output of the photosensor may be used in conjunction with an ambient light sensor to produce an error signal to modify the intensity of the cathode ray tube whereby the contrast level can be held constant at a level to suit an individual viewer's preferences. The normal slow deterioration of the cathode ray tube response characteristic can be compensated and the amount of compensation provides a means for determining when the tube should be replaced. The periodic electron beam deflection feature also provides a built-in test feature of the associated electronic circuitry operating in conjunction with the CRT.

A primary object of the invention is to provide automatic closed-loop display brightness control to track the ambient light level.

Another object of the invention is to provide an automatic closed loop check of the cathode ray tube operation.

Another object of the invention is to provide a positive indication of impending cathode ray tube failure when due to loss of phosphor coating responsiveness.

Another object of the invention is to provide an automatic check of the deflection and video circuits.

Another object of the invention is to provide a means for correcting deflection drift of the electron beam.

Another object of the invention is to provide a means for correcting any non-linear deflection of the electron beam.

Another object of the invention is to provide a means for accurate gamma correction to obtain a maximum number of shades of grey for high-quality television or radar images.

DESCRIPTION OF THE PREFERRED EMBODIMENT

Recent trends in airborne and ground instrumentation and display systems have attempted to maximize the amount of information available from a given display area. Where feasible, the interrelationships between two or more information inputs have been combined to provide the pilot with a visual indication or display. A cathode ray tube is admirably suited to provide such indications because of the myriad of information that can be visually displayed simultaneously. However, a previously prevalent problem area evident with a cathode ray tube has been that of legibility under changing light conditions and decaying cathode ray tube response conditions. A dim cathode ray tube display is subject to being "washed out" under bright ambient light conditions, but if adjusted for those conditions, it will be uncomfortably bright under dim ambient light conditions. The instant invention provides a means for solving the extant problems and permitting the cathode ray tube to become an accepted vehicle for portraying a variety of related information inputs.

Figure 1:
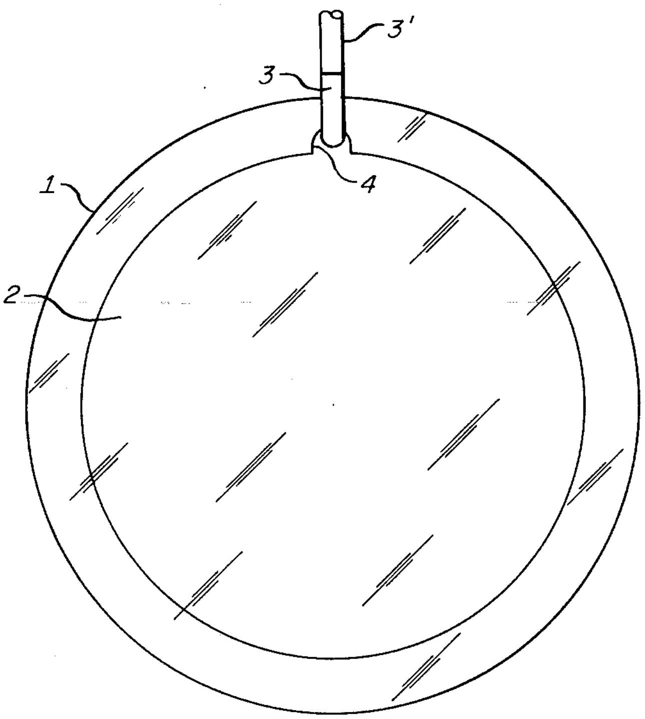
FIGS. 1, 1a and 1b illustrate front and side views of a cathode ray tube with an imbedded fiber optics bundle.
Figure 1A:
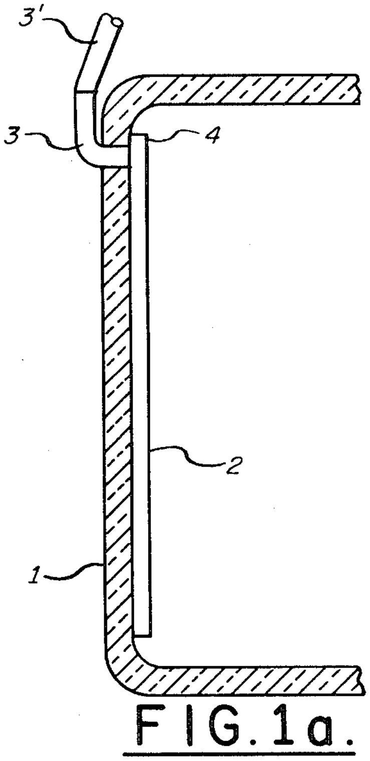
Figure 1B:
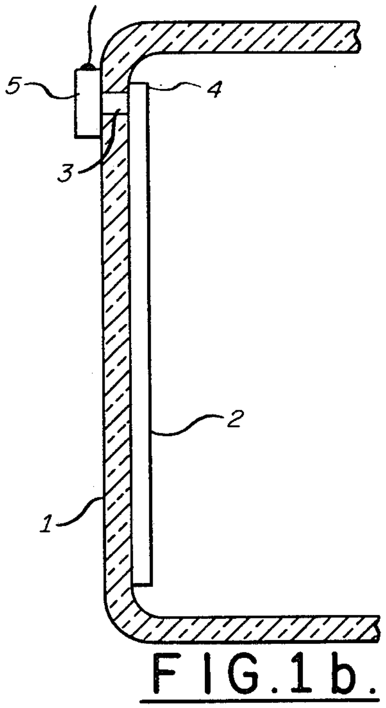

FIGS. 1, 1*a* and 1*b* depict the front and side views of a cathode ray tube (hereinafter referred to as CRT) comprising a transparent envelope with a faceplate 1, usually glass, a phosphor coating 2 on the interior side of the faceplate 1, and imbedded fiber optics probe 3. The general construction and normal operation of a CRT is well known in the art and forms no part of the invention. Normally, the phosphor coating 2 is coincident with the interior surface of the faceplate 1 and defines the viewed area of the CRT. For reasons that will become apparent, the phosphor coating 2 may be extended to a discrete small area, such as 4, out of the viewing area.

A fiber optics probe 3 is imbedded within and sealed to the CRT faceplate at a point coincident with the phosphor coating 2 so that the probe 3 is adjacent to the phosphor coating 2. This provides a rigid and firm connection to the faceplate and prevents accidental misalignment, breakage, or damage. The point of attachment may be within the viewing area or within the extended portion 4. For maximum utilization of the viewing area, the probe 3 would be located within the extended portion 4 and the phosphor coating 2 would be extended thereto. In operation, any excitation of the phosphor coating 2 adjacent the probe 3 and producing a luminescent signal, will provide a direct input to the fiber optics probe 3. As is well known in the art, such an input will be transmitted by the fiber optics bundle 3'. A photosensor affixed directly to the other end of the bundle 3 senses the luminescent signal.

Alternatively, the probe 3 may also be adjacent the faceplate 1 but not imbedded therein. In this modification, the end of the probe 3 would incorporate a lens system so that the adjacent phosphor coating excitation would be accurately picked up by the probe 3. By utilizing appropriate optical considerations, the probe 3 could be shielded from ambient and reflected light so that it would only be responsive to the desired test portion of the phosphor coating 2. A disadvantage of this modification is that a portion of the luminescent signal generated by a portion of the phosphor coating 2 not under test may be reflected within the faceplate 1 and provide an input to the probe 3. At some distance from the point of attachment of the rigid probe 3, there may be connected a flexible fiber optics bundle 3′ for routing the luminescent signal input to a photosensor 5.

In a further modification as shown in FIG. 1b, the probe 3 may be imbedded in the faceplate 1 adjacent the phosphor coating 2 and terminating at the exterior surface of the faceplate 1. A photosensor 5 is attached to the faceplate 1 adjacent the end of the probe 3. Thus, the luminescent signal generated by excitation of the phosphor coating 4 will be transmitted by the probe 3 directly to the photosensor 5 and converted to an equivalent electrical signal. The advantage herein is that of the additional convenience of subsequently routing electrical rather than optical signals.

Figure 2:
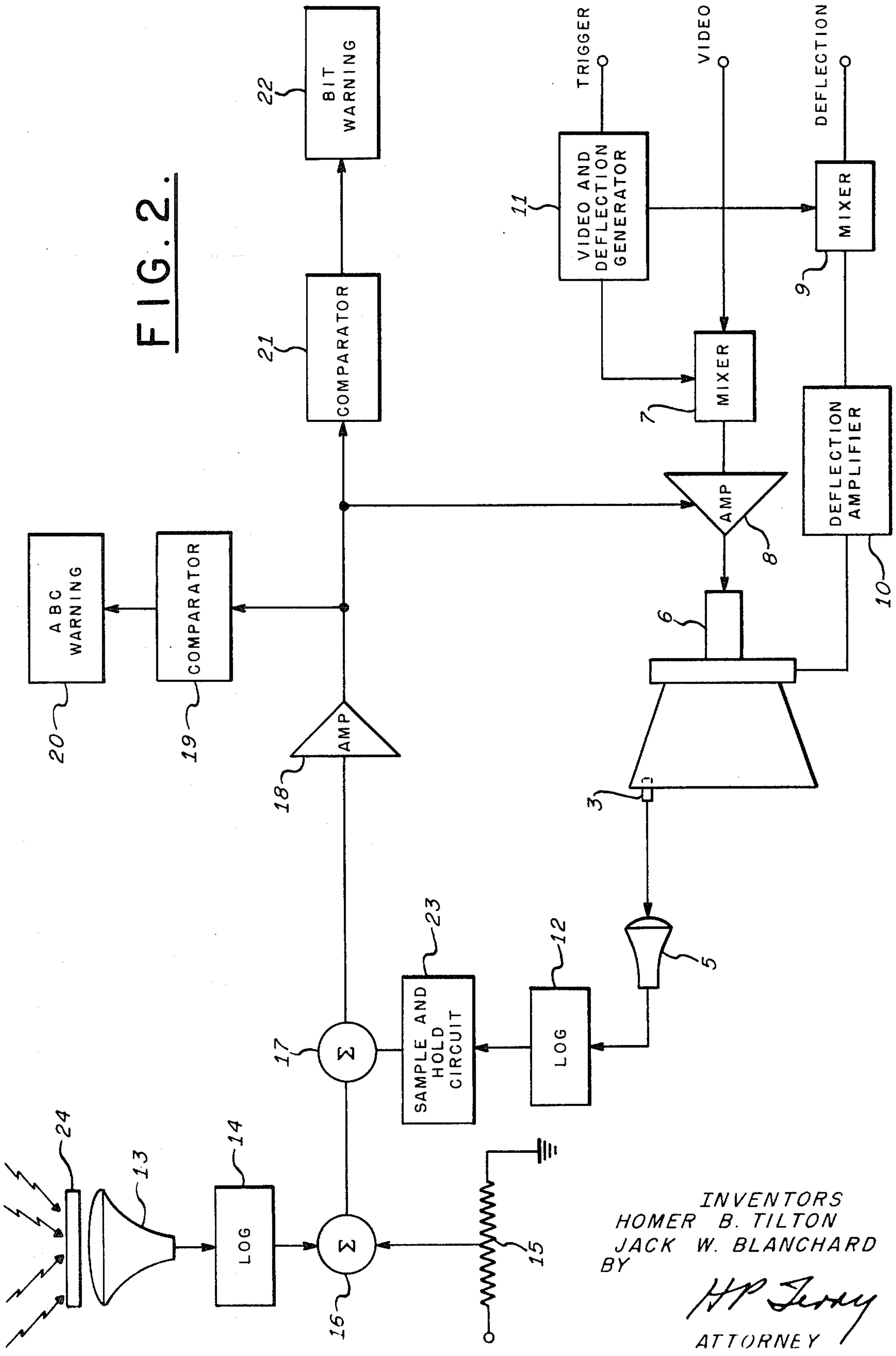
FIG. 2 illustrates the components comprising the system incorporating the invention.

FIG. 2 illustrates a basic schematic for incorporating the invention. The CRT 6 has associated therewith a standard video signal input, but including a mixer 7 and an electrically variable gain amplifier 8, and a standard deflection signal input, but including a mixer 9 and an amplifier 10. As previously discussed, the CRT faceplate 1 has an optical probe 3 imbedded in a portion of the faceplate area. Under normal operation of the CRT, the phosphor coating 2 adjacent the probe 3 will be excited and provide an input to probe 3. If the probe 3 is located outside the viewed portion of the faceplate 1, the standard raster scan will not excite the phosphor coating under test.

To provide a scan of the phosphor coating associated with the probe 3, when it is outside the viewing area, additional deflection and video information signals must be introduced. Unit 11 generates these signals and each is summed with the standard video and deflection circuitry at mixers 7 and 9, respectively. The timing of these signals may be at the end of each frame or a series of frames. At the completion of a selected frame, a trigger signal is generated (not shown) to generate the video and deflection test signals. The CRT electron beam will then be appropriately deflected to a point on the phosphor coating 4 adjacent the probe 3 and excite the phosphor coating to produce a luminescent signal.

The luminescent signal is transmitted directly by the fiber optics, or via a lens system (not shown) to a photosensor 5. The photosensor 5 will respond by converting the received light signal to an equivalent electrical signal (pulse). This signal necessarily has a large dynamic range and would necessitate complex expensive equipment unless converted to a different scale. Unit 12 converts the signal to a logarithmic (log) equivalent pulse signal, compressing the dynamic range of the signal, and thereby permits the use of available components henceforth without impairing the range of response. This pulse signal is converted to a d.c. signal by the sample and hold circuit 23. A photosensor 13 and filter 24 is located so as to be responsive to the ambient light and its output is converted to the log equivalent in unit 14 for reasons stated above. The filter 24 corrects the response of the photosensor to simulate the human eye response. The contrast level of the CRT is set by potentiometer 15. The ambient light level and potentiometer output are summed in junction 16. This summed signal represents the computed CRT light level and is combined with the actual CRT light level from unit 12 in junction 17. The difference between these two signals represents a CRT brightness error signal which is subsequently used to control the CRT brightness in such a way as to reduce the magnitude of the error signal to less than a small arbitrary voltage.

The CRT error signal provides the control function for the automatic brightness control (ABC) and the built-in test (BIT) feature. A high gain, long time constant amplifier or integrator 18 is used to control the gain of video amplifier 8. As the brightness of the CRT is proportional to the output of amplifier 8, a variation in the error signal will cause a variation of the CRT brightness. Alternatively, the integrated error signal could be used to provide a d.c. grid-cathode bias on the CRT to set its brightness at the required level. In this manner the readability of the CRT will remain at a desired level regardless of changes in the ambient light level.

A highly desirable feature available with the instant invention stems from the use of a closed loop system as opposed to the open loop systems previously used.

The phosphor coating 2 of a CRT is subject to a long-term loss in response characteristics, which over a given time period, decreases its responsiveness to electron beam excitation. In due time, the brightness will lessen unless the excitation voltage is increased. Prior open loop brightness control systems could modify the CRT brightness in proportion to the ambient light, but each system had to assume a given constant CRT response characteristic. In the instant invention such an assumption is unnecessary. The use of the probe 3 to test a representative portion of the phosphor coating 2 permits the system to compare the actual, not a forecast, CRT response characteristic with the ambient light to establish an excitation level. The useful life of the CRT is thereby substantially prolonged without the necessity of recalibration of the CRT response characteristic after it has decayed beyond a certain level. The invention may, of course, be incorporated in a variety of CRT type display systems having a different phosphor coating compositions, or other coatings having light generating characteristics in response to excitation.

CRT life monitoring may be accomplished by comparator 19 which compares the magnitude of the processed error signal against a fixed threshold. If the threshold is exceeded, a warning device 20 is activated indicating that the CRT requires an increase in drive to maintain a given brightness, and provides a warning that the CRT phosphor is aging.

Although the BIT system will test the operation of the ABC system, its primary purpose is to insure accuracy of the deflection and video driving circuitry. The BIT comparator 21 and warning indicator 22 operate similarly to the CRT life units but are designed to provide an indication of a failure of the display system resulting in the phosphor coating 2 not being excited in the desired manner. The threshold limit of the BIT system is higher than that of the ABC system as deterioration of the phosphor coating, etc., may provide a reduced output but does not necessarily render the CRT completely useless. When the BIT warning indicator is activated, the CRT system has become unreliable and its utility is terminated, until repaired.

If, for any reason, a fault occurs which permits a continuing but inaccurate deflection of the electron beam, the CRT may appear to be functioning, yet faulty information would be displayed. By placing the probe 3 out of the normal viewing area, and normal raster scan, a unique electron beam deflection must be accomplished periodically. The unique electron beam deflection requirement would expose the fault condition as it is assumed that test portion of the phosphor coating would not be excited. If desired, additional sophistication might be incorporated by requiring the deflection circuitry to trace a unique pattern across the light pipes of the probe 3. Selected light pipes within the probe 3 would then transmit a portion of the pattern and the output of each would be tested. A change in response of the light pipes would be indicative of either a change in linearity or drift of the electron beam. Automatic corrective measures could be initiated to calibrate the electron beam.

If, while the luminous spot is positioned at the probe 3 location (between frames), the CRT grid bias is swept to obtain the total range of phosphor response from zero to maximum, and the output of the photosensor is then compared with the swept voltage point for point electronically, an accurate gamma characteristic may be obtained for the CRT. The inverse of the gamma characteristic may be synthesized and used to modify the transfer characteristic of the video amplifier to produce an accurate gamma correction; that is, a high degree of linearity between the video signal and the CRT light output.

While the invention has been described in its preferred embodiment, it is to be understood that the words which have been used are words of description rather than limitation and that changes within the purview of the appended claims may be made without departing from the true scope and spirit of the invention in its broader aspects.

We claim:

1. An automatic closed-loop brightness control system for a cathode ray tube display device comprising
- a discrete portion on the face plate of said cathode ray tube,
- a fiber optics probe responsive to light emitted from said discrete portion of said cathode ray tube,
- first detector means coupled to said light conducting means producing a first equivalent electrical signal in accordance with said emitted light,
- second detector means producing a second equivalent electrical signal in accordance with the ambient light level,
- contrast control means for providing a bias level voltage in accordance with a desired contrast level for said cathode ray tube,
- first summing means coupled between said second detector means and said control means for providing a third equivalent electrical signal representative of a computed cathode ray tube light level,
- second summing means coupled between said first summing means and said first detector means for providing an error signal representative of the difference between said first and third equivalent electrical signals, and
- brightness level control means coupled between said second summing means and said cathode ray tube for varying the voltage level of the video signal in accordance with said error signal whereby said light emitted from said cathode ray tube is automatically controlled to maintain a desired ratio relative to said ambient light.

2. An automatic closed-loop brightness control system as described in claim 1 in which the fiber optics probe is embedded in the face plate and adjacent to the phosphorus coating of said cathode ray tube.

3. An automatic closed-loop brightness control system as described in claim 1 in which said light conducting means includes a fiber optics bundle and a lens system disposed adjacent to the face plate of said cathode ray tube.

4. An automatic closed-loop brightness control system as described in claim 1 in which said first and second detector means includes first and second photo sensors respectively.

5. An automatic closed-loop brightness control system as described in claim 1 in which said contrast control means includes a manually adjustable potentiometer.

6. An automatic closed-loop brightness control system as describe in claim 1 in which said first and said second summing, means include means for converting said third equivalent electrical signal and said error signal respectively into equivalent logarithmic signals.

7. An automatic closed-loop brightness control system as described in claim 1 in which said brightness level control means includes a high gain, long time constant amplifier coupled to a variable gain amplifier.

8. An automatic closed-loop brightness control system as recited in claim 1 which further comprises first voltage level detector means responsive to said error signal having a first preset threshold corresponding to a specific value of light emitted by the phosphor in said cathode ray tube, and
- first indicator means coupled to said first voltage level detector means for providing a warning indication when said error signal exceeds said first preset threshold thereby indicating the phosphor in the cathode ray tube has attained an advanced age.

9. An automatic closed-loop brightness control system as recited in claim 8 which further comprises second voltage level detector means responsive to said error signal having a second preset threshold corresponding to a minimum acceptable value of light emitted by said phosphor in said cathode ray tube, and
- second indicator means coupled to said second voltage level detector means for providing a malfunction indication when said error signal exceeds said second preset threshold thereby indicating the brightness control system has become unreliable in operation.

10. An automatic closed-loop brightness control system as recited in claim 1 in which said discrete portion on said face-plate of said cathode ray tube is disposed in a non-viewing area of said faceplate and said light conducting means is disposed so that it will not obstruct the viewing area of said cathode ray tube display.

11. An automatic closed-loop brightness control system as recited in claim 10 which further comprises deflection circuit means for periodically deflecting the electron beam of said cathode ray tube to said discrete portion.

12. An automatic closed-loop brightness control system as described in claim 11 in which said deflection circuit means includes means for deflecting said electron beam to said discrete portion at the completion of each frame.

13. An automatic closed-loop brightness control system as recited in claim 10 in which said light conducting means includes a fiber optics probe embedded in said faceplate and oriented substantially transverse to said faceplate.

14. An automatic closed-loop brightness control system as described in claim 13 in which said first detector means further includes a photosensor operably coupled to said fiber optic probe and is disposed in proximity to said faceplate.

* * * * *